United States Patent
Flores et al.

(10) Patent No.: US 7,416,341 B2
(45) Date of Patent: Aug. 26, 2008

(54) CAPILLARY RESERVOIR FOR FDB MOTORS

(75) Inventors: Paco Flores, Felton, CA (US); Anthony J. Aiello, Santa Cruz, CA (US); Klaus D. Kloeppel, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 354 days.

(21) Appl. No.: 11/155,405

(22) Filed: Jun. 16, 2005

(65) Prior Publication Data

US 2006/0285785 A1    Dec. 21, 2006

(51) Int. Cl.
*F16C 32/06* (2006.01)

(52) U.S. Cl. .................. 384/119; 384/100; 384/114

(58) Field of Classification Search .......... 384/100, 384/107, 113, 114, 115, 119, 132; 310/90; 360/99.08, 98.07
See application file for complete search history.

(56) References Cited

U.S. PATENT DOCUMENTS

| | | | |
|---|---|---|---|
| 5,427,456 A | 6/1995 | Hensel | |
| 5,536,088 A | 7/1996 | Cheever et al. | |
| 5,558,443 A | 9/1996 | Zang | |
| 5,558,445 A | 9/1996 | Chen et al. | |
| 5,791,784 A * | 8/1998 | Ichiyama | 384/107 |
| 5,847,479 A | 12/1998 | Wang et al. | |
| 5,980,113 A | 11/1999 | Grantz | |
| 6,020,664 A | 2/2000 | Liu et al. | |
| 6,154,339 A | 11/2000 | Grantz et al. | |
| 6,271,612 B1 * | 8/2001 | Tanaka et al. | 310/90 |
| 6,361,214 B1 * | 3/2002 | Ichiyama | 384/107 |
| 6,378,209 B1 | 4/2002 | Gomyo et al. | |
| 6,404,087 B1 | 6/2002 | Ichiyama | |
| 6,655,841 B1 | 12/2003 | Heine et al. | |
| 6,679,501 B1 | 1/2004 | Pelstring et al. | |
| 6,746,151 B2 | 6/2004 | Le et al. | |
| 6,828,709 B2 | 12/2004 | Grantz et al. | |
| 6,838,795 B2 | 1/2005 | Kloeppel et al. | |
| 6,843,602 B2 * | 1/2005 | Koseki et al. | 384/100 |
| 7,005,768 B2 * | 2/2006 | Tamaoka et al. | 310/90 |
| 7,059,773 B2 * | 6/2006 | Hafen et al. | 384/119 |
| 2003/0190100 A1 | 10/2003 | Grantz et al. | |
| 2005/0286820 A1 | 12/2005 | Grantz et al. | |
| 2006/0023982 A1 | 2/2006 | Uenosono et al. | |
| 2006/0255672 A1 | 11/2006 | Flores et al. | |

FOREIGN PATENT DOCUMENTS

JP    09079272 A *    3/1997

* cited by examiner

*Primary Examiner*—Thomas R Hannon
(74) *Attorney, Agent, or Firm*—Stephen C. Durant; Novak Druce + Quigg LLP

(57) ABSTRACT

For a motor having fluid dynamic bearing(s) defined by surfaces of relatively rotatable motor members, aspects include providing a capillary reservoir between relatively irrotatable surfaces. The capillary reservoir may comprise a tapering gap that is vented to a gaseous environment through one end of the gap and is in fluidic communication with the fluid dynamic bearing(s) through another end of the gap. The gap may be axial, and the capillary reservoir may be disposed coaxially with one or more of the fluid dynamic bearing(s) about an axis of rotation. The capillary reservoir may extend from proximate a top portion of the motor to proximate a bottom portion of the motor.

12 Claims, 4 Drawing Sheets

CAPILLARY RESERVOIR FOR FDB MOTORS

BACKGROUND

1. Field

The present invention relates generally to storage of liquid in Fluid Dynamic Bearing (FDB) motors and more particularly to capillary reservoirs for use in FDB motors.

2. Description of Related Art

Capillary seals are presently used to retain lubricating liquid (e.g., oil) at hydrodynamic bearing surfaces of disc drive motors and to provide a reservoir of lubricating liquid to replace lubricating liquid lost through evaporation and other causes.

Typical capillary seals are formed between radially opposing surfaces of coaxial relatively rotatable motor members, e.g., between an outer surface of a fixed shaft and an inner surface of a rotating hub disposed around the shaft, as shown in FIG. 2a. Typically, either the shaft or the hub is machined so that the radially opposing surfaces form a tapering gap with respect to each other. The gap typically has an annular cross-section, as illustrated in FIG. 2b. The tapering gap functions as a reservoir of lubricating liquid as well as a capillary seal, and therefore the volume of the tapering gap largely determines a reserve amount of lubricating liquid to provide for loss of lubricating liquid. However, higher volumes of lubricating liquid (which may enable longer lived motors) typically require that the tapering gap have a wider annular cross-section, which may reduce the ability of a meniscus of the capillary seal to retain lubricating liquid. What is needed are further ways to store lubricating liquid and supply that lubricating liquid to hydrodynamic bearing surfaces in fluid dynamic bearing motors.

SUMMARY

Aspects include a capillary reservoir that comprises a first radial surface of a first member and a second radial surface of a second member. The first radial surface is coaxial with and opposing the second radial surface. The first radial surface and the second radial surface are irrotational with respect to each other. The first radial surface and the second radial surface provide an axially tapering gap formed between the first radial surface and the second radial surface. The axially tapering gap is in fluidic communication with a hydrodynamic bearing region formed between a third surface and a fourth surface.

Further aspects include a motor including a tapering gap for providing a capillary reservoir. The tapering gap formed between a first surface of a first member and a second surface of a second member, the first surface and the second surface relatively irrotational. The tapering gap is in fluidic communication with hydrodynamic bearing region(s) formed between a third surface and a fourth surface. The first surface and the second surface may be radial surfaces, and may be coaxially disposed about an axis of rotation.

Further aspects include a method of assembling a fluid dynamic bearing motor, the method comprising providing a first motor member having a first surface and a second motor member having a second surface. The first surface and the second surface formed such that upon disposition a tapering gap is formed between the first surface and the second surface, and the first surface and the second surface are relatively irrotational. The method further comprises providing a third motor member having a third surface, the third surface and a fourth surface formed for a disposition that provides for relative rotation of the third motor member and the first motor member, a hydrodynamic bearing region formed between the third surface and the fourth surface, and fluidic communication between the tapering gap and the hydrodynamic bearing region. The fourth surface may be a surface of the first motor member or the second motor member. The method also comprises disposing the first motor member, the second motor member, and the third motor member.

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disc storage drives. Motors for disc storage drives may be designed and may operate in a number of ways. The exemplary motors and other exemplary subject matter provided herein are for illustrating various aspects and are not intended to limit the range of motors and devices in which such examples and aspects may be applied.

Figure 1:
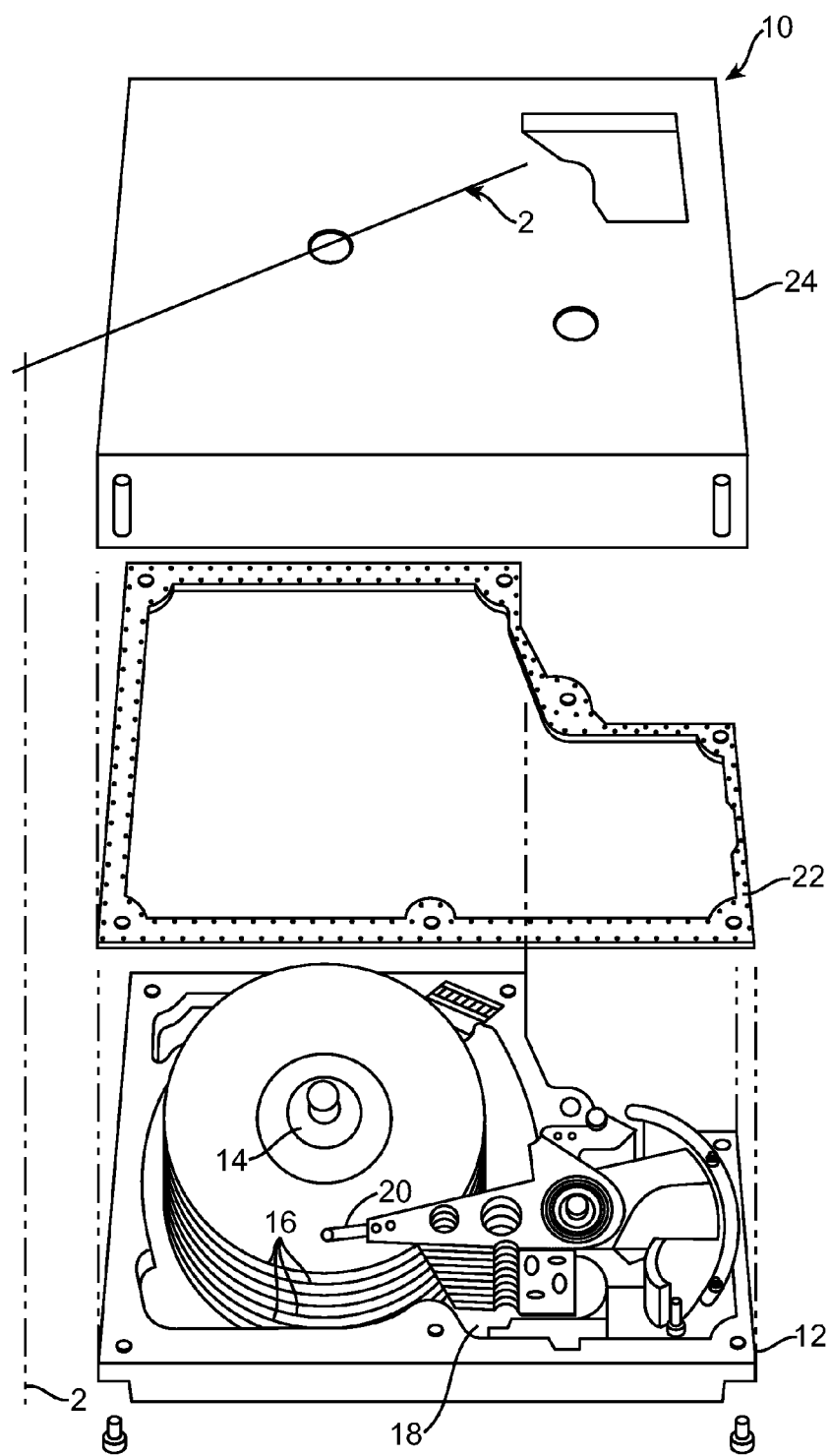
FIG. 1 illustrates a plan view of an exemplary disc drive.

Turning to FIG. 1, a plan view of an exemplary magnetic disc drive storage system is illustrated. In this example, the storage system 10 includes a housing base 12 having spindle motor 14 which rotatably carries storage discs 16. An armature assembly 18 moves transducers 20 across the surface of the discs 16. The environment in which discs 16 rotate may be sealed by seal 22 and cover 24. In operation, discs 16 rotate at high speed while transducers 20 are positioned at any one of a radially differentiated track on the surface of the discs 16. This allows transducers 20 to read and write magnetically encoded information on the surfaces of discs 16 at selected locations. Discs 16 may rotate at many thousand RPM.

To produce rotation of discs 16, spindle motor 14 typically includes at least one rotatable portion. The at least one rotatable portion in turn typically interfaces with one or more non-rotating surfaces, that may form journal and/or thrust hydrodynamic bearings. Hydrodynamic bearings incorporate liquid lubricants, such as oil between the rotatable portion(s) and fixed portion(s) of spindle motor 14. Capillary seals help confine liquid lubricant to areas intended for lubrication and also provide a reservoir of liquid lubricant that compensates for losses due to evaporation, spillage and the like.

Figure 2A:
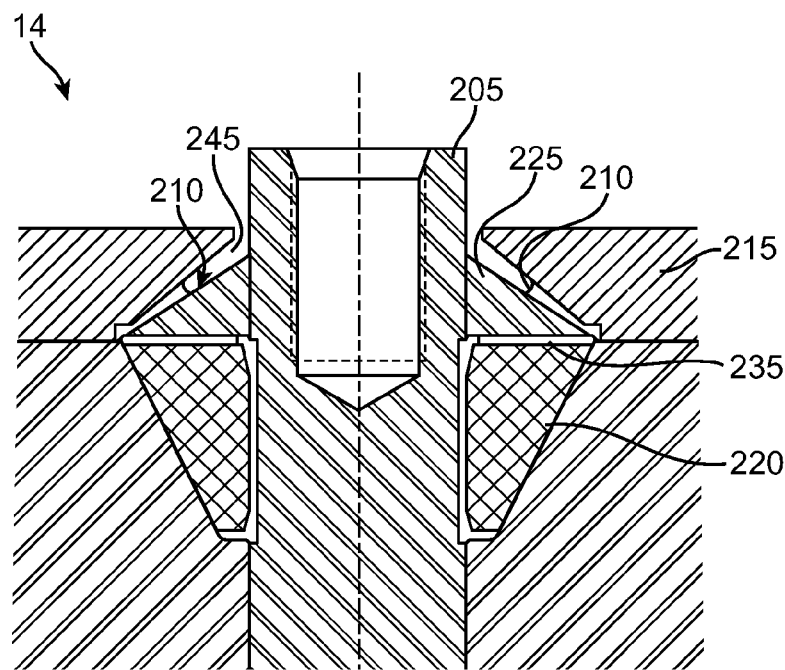
FIG. 2a illustrates a vertical cross-section of a disc drive motor portion.

FIG. 2a illustrates a vertical cross-section of a portion of an exemplary motor 14 having a prior art capillary seal 210 (which also serves as a lubricating liquid reservoir). This motor includes a shaft 205, a sealing cone 225 and a rotatable hub 215. The sealing cone 225 has an outer surface that radially opposes an inner surface of rotatable hub 215. The outer surface of sealing cone 225 and the inner surface of the rotatable hub 215 taper with respect to each other, thereby forming a capillary seal portion 210 that has a cross-section which tapers in area from a vent opening 245 towards an opening in fluidic communication with a hydrodynamic bearing surface 220. Recirculation channel 235 equalizes pressure at boundaries of the hydrodynamic bearing surface 220 and produces a fluid circulation path to allow fluid to flow across the hydrodynamic bearing surface 220.

Capillary seal 210 is partially filled with lubricating liquid that forms a meniscus. Because capillary seal 210 stores lubricating liquid that is not presently needed for operation of motor 14, capillary seal 210 also functions as a reservoir for lubricating liquid. Notably, capillary seal 210 and hydrodynamic bearing surface 220 are each formed between surfaces of rotatable hub 215 and sealing cone 225. Such a relative disposition typifies a prior art aspect that lubricating liquid reservoirs are usually formed between relatively rotatable motor members, and in close proximity to one or more hydrodynamic bearing regions (e.g., hydrodynamic bearing region 220) to which the reservoir supplies lubricating liquid.

Figure 2B:
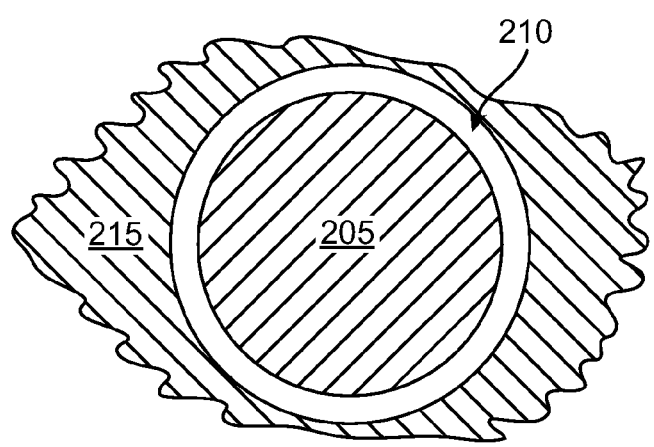
FIG. 2b illustrates an annular capillary seal cross-section.

A schematic view of capillary seal 210, with hub 215 and sealing cone 225 demarcated in FIG. 2b conceptually illustrates that prior art capillary seals/reservoirs typically have annular cross-sections, where the differences in radii of inner and outer boundaries of each cross-section is relatively small.

As a motor ages, lubricating liquid may be lost through evaporation or escape of the lubricating liquid from the capillary seal(s). Thus, a typical capillary seal is designed to provide a volume of lubricating liquid to compensate for that loss of lubricating liquid. As illustrated in FIG. 2a, providing a larger reservoir of lubricating liquid in the capillary seal imposes design difficulties because a longer capillary seal of the type in FIG. 2a/b is more difficult to fit within a motor and generally requires alterations in the design of various motor members. However, a wider capillary seal, which has a higher volume for a seal of a given length and taper angle, is less robust than a narrower lower volume capillary seal.

Figure 3:
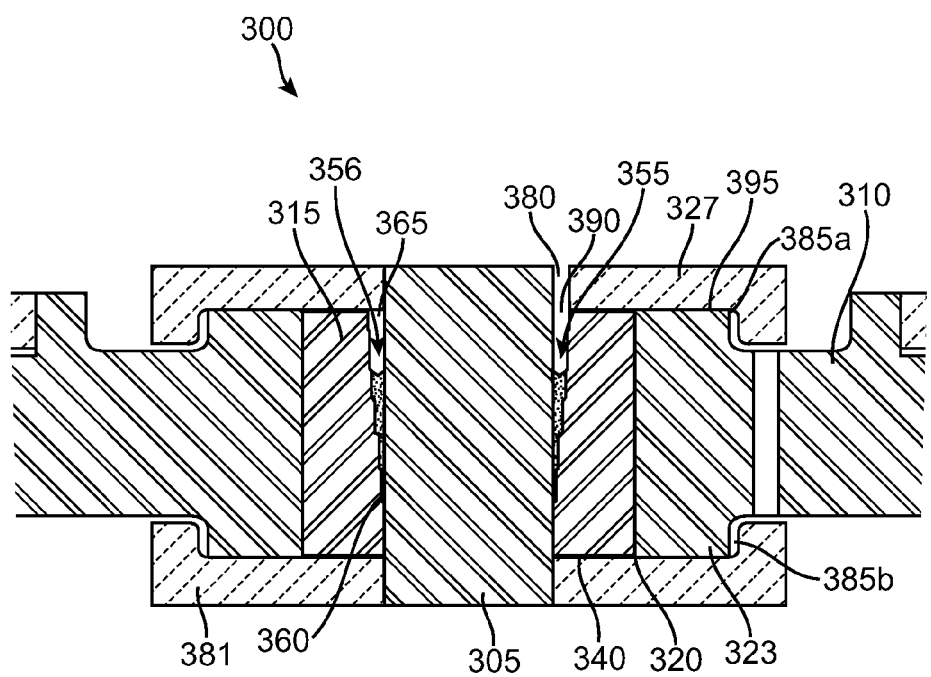
FIG. 3 illustrates a cross-section of an exemplary disc drive motor portion.

Now turning to FIG. 3, an exemplary disc drive motor portion 300 including a capillary reservoir 355 is illustrated and described. A sleeve 315 is co-axially disposed about a shaft 305. Sleeve 315 includes an inner surface interfacing with an outer surface of shaft 305. The inner surface of sleeve 315 and the outer surface of shaft 305 form a gap that tapers from a wider opening 365 towards a narrower opening 360, thereby forming the capillary reservoir 355. A primary meniscus 356 is formed by liquid disposed in at least a portion of the capillary reservoir.

In this example, shaft 305 and sleeve 315 remain stationary with respect to each other. Rotating hub 310 is co-axially disposed about an outer surface of sleeve 315. Rotating hub 310 includes an inner surface interfacing with a second surface of sleeve 315 and thereby forming hydrodynamic bearing regions 320. Additional hydrodynamic bearing regions in this exemplary motor portion 300 include a first thrust bearing region 323 formed at a bottom surface of hub 310 where hub 310 interfaces with base 381, and a second thrust bearing region 395 formed between a counterplate 327 and a top surface of hub 310.

The counterplate 327 is disposed with shaft 305 and sleeve 315 and serves to shield to a degree capillary reservoir 355 from an ambient environment in which the exemplary motor functions. In this example, a vent 380 is provided through counterplate 327 to vent capillary reservoir 355 to the ambient environment, which may contain a gas or a mixture of gasses.

Liquid (such as lubricating liquid) disposed in motor portion 300 forms a secondary meniscus at each of openings 385a and 385b and opening 390. These menisci are comparatively small in surface area to the meniscus illustrated in FIG. 2a/2b, which may reduce evaporation of lubricating liquid from openings 385a, 385b and 390.

Capillary reservoir 355 is in fluidic communication with hydrodynamic bearing regions 320 proximate narrower opening 360. In this example, this fluidic communication is enabled by channel 340 at a bottom of sleeve 315. As discussed above this exemplary capillary reservoir 355 is formed between two non-relatively rotating members (shaft 305 and sleeve 315), by contrast with typical prior art capillary seals/reservoirs (e.g., FIG. 2a).

Capillary reservoir 355 is also relatively long (e.g., is axially deep along an axis of rotation of hub 310) compared with other dimensions that define a volume of lubricating liquid stored therein. Such other dimensions include the radial distance between the opposing surfaces of shaft 305 and sleeve 315 that form capillary reservoir 355. This relative length is illustrated in FIG. 3, since capillary reservoir 355 continues from near a top of sleeve 315 to near a bottom of sleeve 315, which is a relatively large distance compared with the radial distance between the surfaces forming the tapering gap of capillary seal 355. This relative length is further illuminated by contrast with many prior capillary reservoirs that typically have been disposed axially along a gap shared with one or more hydrodynamic bearings (such as a journal bearing). Thus, the reservoir in such prior art would not have a length that continues in the gap from near a top of a bearing sleeve to near a bottom of the bearing sleeve because the hydrodynamic bearing(s) would occupy a portion of that gap.

Figure 4:
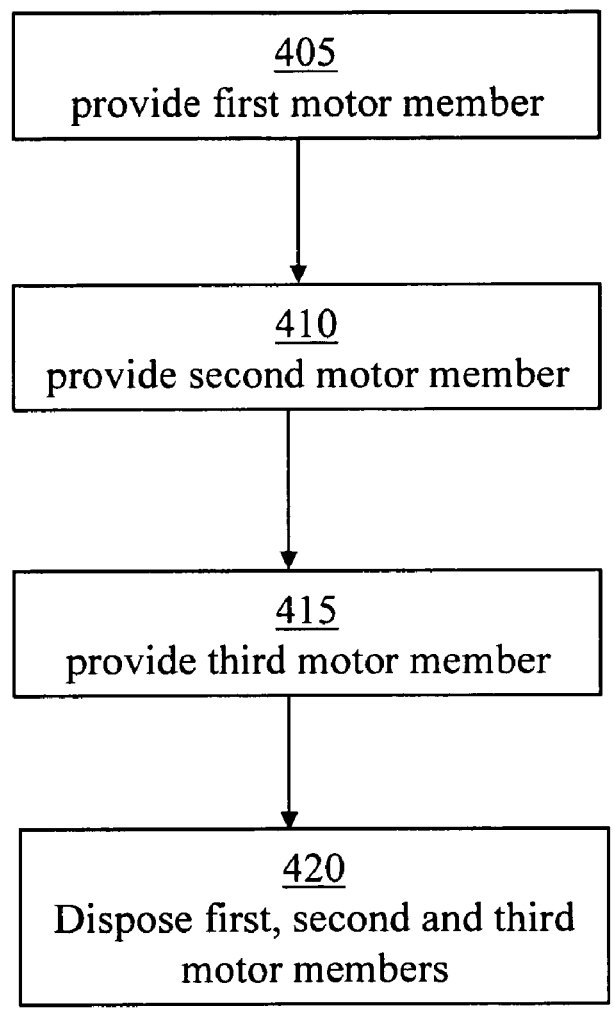
FIG. 4 illustrates an exemplary method of assembly a motor including a capillary reservoir.

FIG. 4 illustrates an exemplary method of forming and assembling a motor according to aspects described above. In step 405, a first motor member is provided. The first motor member includes a first surface. In step 410, a second motor member including a second surface is provided. The first motor member and the second motor member having been formed such that upon relative disposition the first surface and the second surface would (1) define a tapering gap, and (2) be relatively irrotational with respect to each other.

In step 415, a third motor member including a third surface is provided. The third surface formed such that upon disposition of the third motor member, the third surface (1) forms hydrodynamic bearing region(s) with a fourth surface, and (2) may rotate relative to the first motor member and the second motor member about an axis of rotation. The fourth surface may be a surface of the first motor member or the second motor member. The first, second and third motor members are further formed such that upon disposition, the tapering gap is in fluidic communication with the hydrodynamic bearing regions(s). The first and the second motor members may further be formed such that upon disposition the tapering gap is vented to a gaseous environment. The first motor member and the second motor member may be further formed to cause the tapering gap to taper generally axially with the axis of rotation. Step 420 includes disposing the first, second and third motor members.

Thus, according to the exemplary method illustrated in FIG. 4, hydrodynamic bearing regions are formed upon relative disposition of the third motor member with the first and the second motor members, and a tapering gap (which may axially taper) for forming a capillary reservoir is formed upon relative disposition of the first motor member and the second motor member. As described above, the hydrodynamic bearing region(s) and the capillary reservoir are each formed between two different pairs of surfaces, rather than between a single pair of surfaces as is typical in the prior art.

Motor and capillary reservoir aspects have been illustrated and described herein. One of ordinary skill in the art would understand that teachings related to such aspects may be adapted to other designs for motors, capillary reservoirs, and the like. Also, it would be understood that certain components have been separately identified herein, but such identification does not imply that such components must be separately formed from other components. Similarly, components identified herein may be subdivided into sub-components in other designs. Additionally, features such as recirculation channels, bearing surfaces, grooves of various sorts, and the like may be disposed additionally or differently than presented in aspects herein.

Other modifications and variations would also be apparent to those of ordinary skill in the art from the exemplary aspects presented. By example, various exemplary methods and systems described herein may be used alone or in combination with various fluid dynamic bearing and capillary seal systems and methods. Additionally, particular examples have been discussed and how these examples are thought to address certain disadvantages in related art. This discussion is not meant, however, to restrict the various examples to methods and/or systems that actually address or solve the disadvantages.

We claim:

1. A capillary reservoir, comprising:
   a first member having a first radial surface;
   a second member having a second radial surface, the first radial surface coaxial with and opposing the second radial surface, the first radial surface and the second radial surface irrotational with respect to each other; wherein
   the first radial surface and the second radial surface define an axially tapering gap, the axially tapering gap in fluidic communication with a hydrodynamic bearing region defined by a third surface and a fourth surface;
   wherein the third surface includes a radial surface of a third member, the fourth surface includes a second radial surface of the first member, the radial surface of the third member and the second radial surface of the first member generally coaxial with the first radial surface and the second radial surface about an axis of rotation, and radially opposing each other; and
   wherein the third member is disposed radially more distal the axis of rotation than the first member and the second member.

2. The capillary reservoir of claim 1, wherein the second member is a shaft and the first member is a sleeve.

3. The capillary reservoir of claim 1, wherein the third member includes a hub, the first member includes a sleeve, and the second member includes a shaft.

4. The capillary reservoir of claim 1, wherein the third member is relatively rotational with the first member.

5. The capillary reservoir of claim 1, wherein the third member is relatively rotational with the second member.

6. The capillary reservoir of claim 1, wherein the axially tapering gap is in fluidic communication with a gaseous environment and lubricating liquid is disposed in at least a portion of the axially tapering gap.

7. The capillary reservoir of claim 1, wherein the hydrodynamic bearing region is a journal bearing.

8. A motor, comprising:
   a first member having a first radial surface;
   a second member having a second radial surface, the first radial surface coaxial with and opposing the second radial surface, the first radial surface and the second radial surface irrotational with respect to each other; wherein
   the first radial surface and the second radial surface define an axially tapering gap, the axially tapering gap in fluidic communication with a hydrodynamic bearing region defined by a third surface and a fourth surface;
   wherein the third surface includes a radial surface of a third member, the fourth surface includes a second radial surface of the first member, the radial surface of the third member and the second radial surface of the first member generally coaxial with the first radial surface and the second radial surface about an axis of rotation, and radially opposing each other; and
   wherein the third member is disposed radially more distal the axis of rotation than the first member and the second member.

9. The motor of claim 8, wherein the first member is a sleeve and the second member is a shaft.

10. The motor of claim 9, further comprising lubricating liquid disposed in at least a portion of the tapering gap, the lubricating liquid forming a meniscus therein.

11. The motor of claim 8, wherein the hydrodynamic bearing region includes a journal bearing that extends from proximate a first end of the first member to proximate a second end of the first member.

12. The motor of claim 8, wherein lubricating liquid is disposed in the tapering gap, and the lubricating liquid is retained by at least one secondary meniscus formed between the third surface and the fourth surface.

* * * * *